J. A. ATWOOD.

CROSS TIE FOR RAILWAYS.

APPLICATION FILED AUG. 19, 1914.

Reissued Oct. 27, 1914. 13,814.

WITNESSES

J. R. Keller

Irene Geyer

INVENTOR

John A. Atwood by Kay Tatton & Connell attys

THE NORRIS PETERS CO., PHOTO-LITHO., WASHINGTON, D. C.

UNITED STATES PATENT OFFICE.

JOHN A. ATWOOD, OF BEAVER, PENNSYLVANIA.

CROSS-TIE FOR RAILWAYS.

13,814. Specification of Reissued Letters Patent. Reissued Oct. 27, 1914.

Original No. 909,359, dated January 12, 1909, Serial No. 435,227. Application for reissue filed August 19, 1914. Serial No. 857,616.

*To all whom it may concern:*

Be it known that I, JOHN A. ATWOOD, residing at Beaver, in the county of Beaver, in the State of Pennsylvania, a citizen of the United States, have invented or discovered certain new and useful Improvements in Cross-Ties for Railways, of which improvements the following is a specification.

The invention described herein relates to certain improvements in cross-ties for railways, and has for its object a construction wherein the desirable features of a metallic tie are attained and the difficulties of effecting and maintaining the insulation of the rails relative to each other are overcome.

The invention is hereinafter more fully described and claimed.

Figure 1:
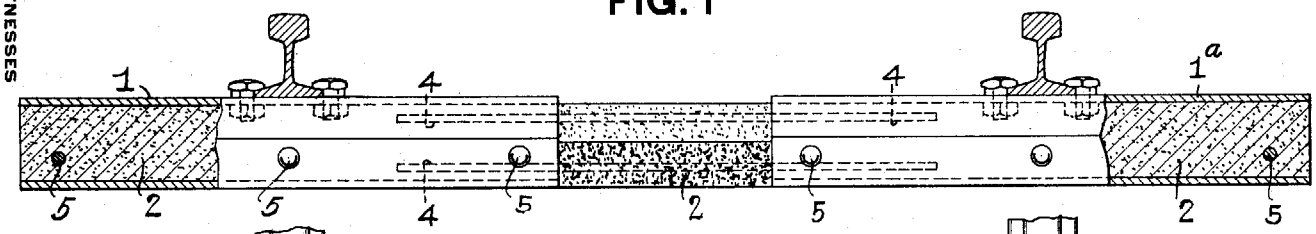
Figure 2:
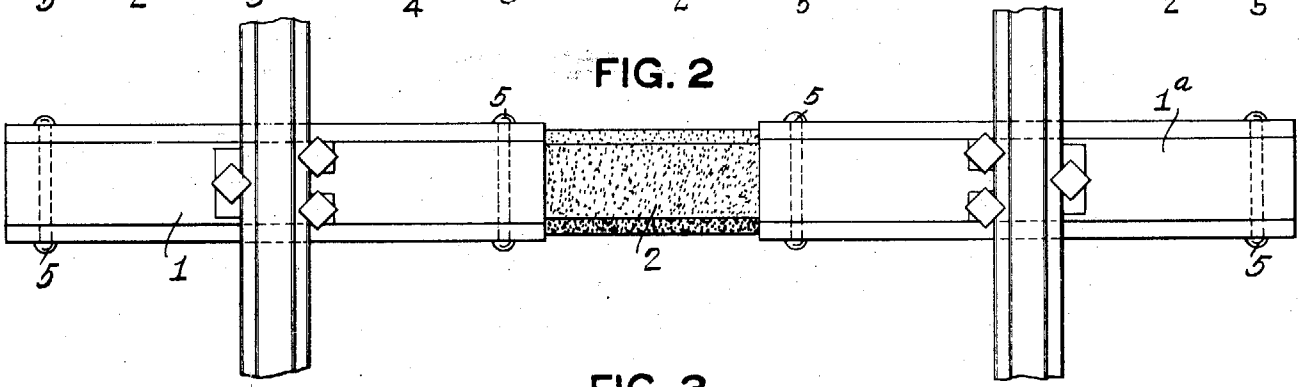
Figure 3:
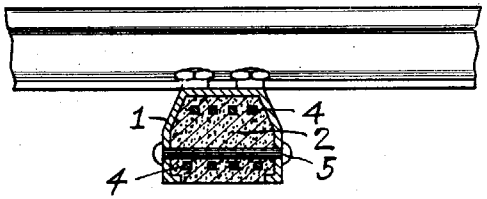

In the accompanying drawing forming a part of this specification, Figure 1 is a side elevation of my improved cross-tie, showing rails secured thereto; Fig. 2 is a top plan view of the structure shown in Fig. 1; and Fig. 3 is an end elevation.

My improved cross-tie consists of two metallic sections 1 and 1ª of an inverted U-shape in cross-section. Each of these sections is made of such a length, less than half the total length of the tie, as to afford an efficient transverse foundation for the rail to prevent any upsetting movement.

It is characteristic of the invention described herein that the metal shells 1 and 1ª are made of such a size and shape as to afford in and of themselves a sufficient support for the rails. For example: the section might be of a length approximately not less than half the standard gage or distance between the rails, but less than half the total length of the tie. These sections are tied together longitudinally by filling pieces 2 formed of insulating material such as wood, concrete, etc. These filling or connecting pieces extend into and preferably through the metal sections 1 and 1ª. When the filling or connecting sections are formed of concrete, it is preferred to strengthen them longitudinally by tie rods 4 which may extend the entire length of the tie.

In addition to tying the metal sections together, the filling serves to give an efficient bearing surface on the underside of the tie, to hold the same against longitudinal movement. In order to prevent any spreading of the sides of the metallic sections, such sides are held in position by transverse rivets 5 or other suitable means.

It will be observed that the metallic sections not only inclose and protect the filling portion by which they are electrically insulated from each other but they also form an efficient support for the rails, and that the rail securing devices which may be of any suitable construction are attached to these metallic sections.

As will be readily understood by those skilled in the art a railway tie may be considered as consisting of three parts or members, to wit, the end portions forming collectively about two thirds of the entire tie and the intermediate or connecting portion. The main function of the tie is to afford a firm foundation or support for the rail and this can be had by independent sections or blocks for each rail, each section being approximately one third of the entire length of the tie now employed. The portion of the tie now used, intermediate of the foundation or supporting sections, serves mainly if not entirely as a connecting member to maintain the rails the required distance apart. As regards its function of supporting the rail, the tie need not extend more than eighteen or twenty inches on each side of the rail. The gage of the rails can be maintained by rods secured to the rails themselves or to the foundation sections. But for convenience and in order to avoid multiplicity of parts, it is preferred that the foundation and connecting member should be formed as an integral structure.

The main purpose of the concrete portion 2 is to maintain the rails at a proper gage and electrically insulate the sections one from another. This concrete portion is molded into the sections and will firmly adhere to the inner walls of the sections so as to tightly tie them in proper relation one to the other.

I claim herein as my invention:

1. In the combination of two metallic sections, each having a length less than one-half the total length of the tie, but approximately not less than half the standard gage or distance between the rails of the track, and having a width approximately equal to one-fourth the length of the sections, whereby each section will form when embedded in ballast a sufficient support or foundation for the rail secured thereto, and an intermediate section formed of insulating material molded into the metallic sections, and thereby serving to hold the metallic sections connected by such insulating section from movement relative to each other.

2. In the combination of two metallic sections, each having a length less than one-half of the total length of the tie, but approximately not less than half the standard gage or distance between the rails of a track, and having a width approximately equal to one-fourth its length, whereby each section will form when embedded in ballast a sufficient support and foundation for the rail secured thereto, an intermediate section formed of insulating material molded into the sections and adapted to hold such sections from longitudinal movement relative to each other, and means for securing the rails to the metallic supporting sections.

3. The combination of two metallic U-shaped sections, each having a length less than half the total length of the tie, but approximately not less than half the standard gage or distance between the rails of a track and having a width approximately equal to one-fourth its length whereby each section will form when embedded in ballast a sufficient support or foundation for the rail secured thereto and an intermediate section formed of insulating material having its ends molded into and firmly engaging the metallic sections and holding such sections from longitudinal movement relative to each other.

4. The combination of two metallic U-shaped sections, each having a length less than one-half the total length of the tie, but approximately not less than half the standard gage or distance between rails of a track and having a width approximately equal to one-fourth its length, whereby each section will form when embedded in ballast a sufficient support or foundation to the rails secured thereto, and a body of concrete molded into and extending through the metallic sections.

5. In the combination of two metallic sections, each having a length not less than half the standard gage or distance between the rails of the track and having a width approximately equal to one-fourth of the length of the sections, whereby each section will form when embedded in ballast a sufficient support or foundation for the rail secured thereto, and an intermediate section formed of insulating material molded into the metallic sections, and thereby serving to hold the metallic sections connected by such insulating section from movement relative to each other.

6. The combination of two metallic sections, each having a length not less than half the standard gage or distance between rails of a track and having a width approximately equal to one-fourth its length, whereby each section will form when embedded in ballast a sufficient support and foundation for the rail secured thereto, an intermediate section formed of insulating material molded into the sections and adapted to hold such sections from longitudinal movement relative to each other, and means for securing the rails to the metallic supporting sections.

7. The combination of two metallic U-shaped sections, each having a length not less than half the standard gage or distance between rails of a track and having a width approximately equal to one-fourth its length whereby each section will form when embedded in ballast a sufficient support or foundation for the rail secured thereto, and an intermediate section formed of insulating material having its ends molded into and firmly engaging the metallic sections and holding such sections from longitudinal movement relative to each other.

8. The combination of two metallic U-shaped sections, each having a length of not less than half the standard gage or distance between rails of a track and having a width approximately equal to one-fourth its length, whereby each section will form when embedded in ballast a sufficient support or foundation to the rails secured thereto, and a body of concrete molded into and extending through the metallic sections.

In testimony whereof, I have hereunto set my hand.

JOHN A. ATWOOD.

Witnesses:
E. P. KUHN,
NORMAN R. MCAFEE.

Copies of this patent may be obtained for five cents each, by addressing the "Commissioner of Patents, Washington, D. C."